Dec. 1, 1953   R. S. CURRY, JR., ET AL   2,661,452
SERVOMOTOR AND CONTROL SYSTEM THEREFOR
Filed Jan. 29, 1948                                    2 Sheets-Sheet 1
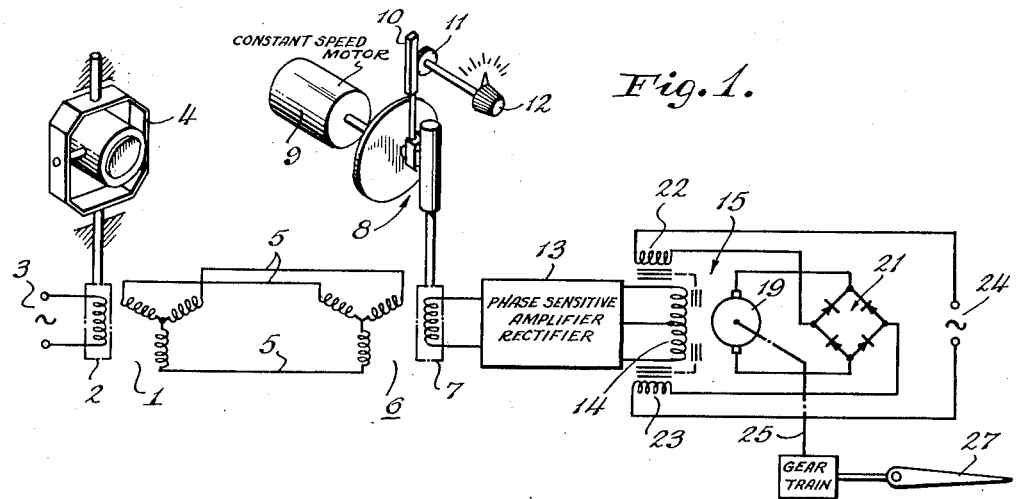
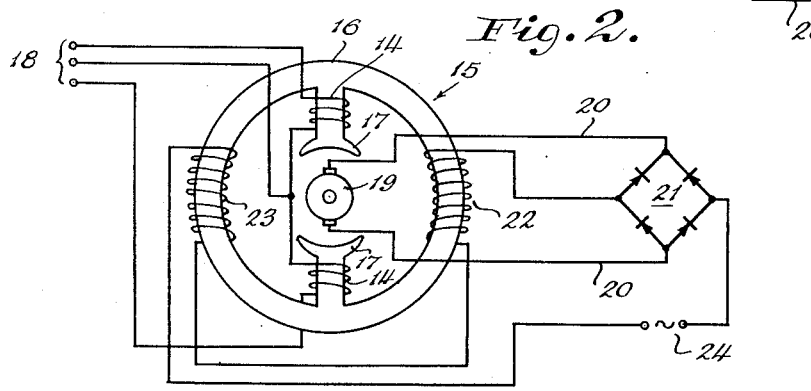
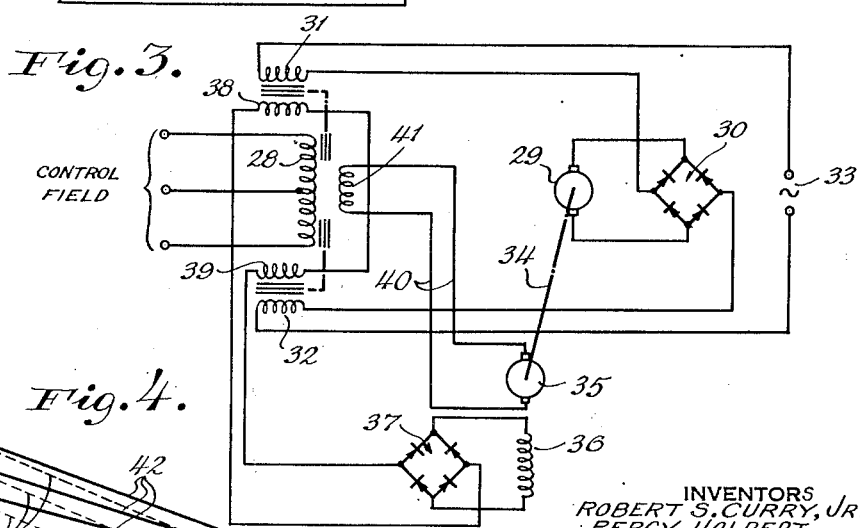
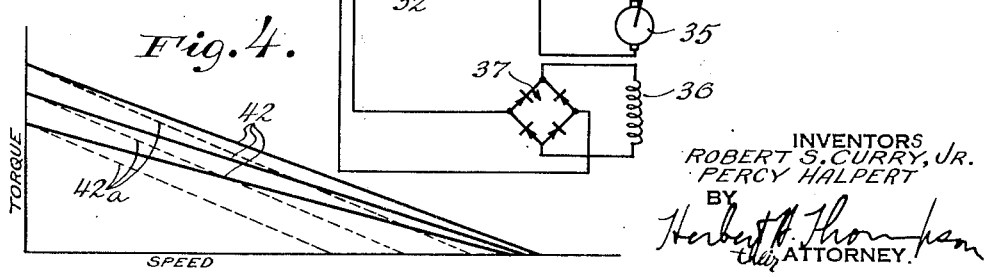
INVENTORS
ROBERT S. CURRY, JR.
PERCY HALPERT
BY
Herbert P. Thompson
ATTORNEY.

Dec. 1, 1953 R. S. CURRY, JR., ET AL 2,661,452
SERVOMOTOR AND CONTROL SYSTEM THEREFOR
Filed Jan. 29, 1948 2 Sheets-Sheet 2
*Fig. 5.*
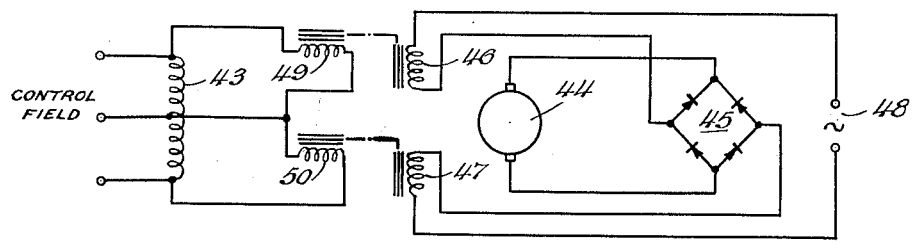
*Fig. 6.*
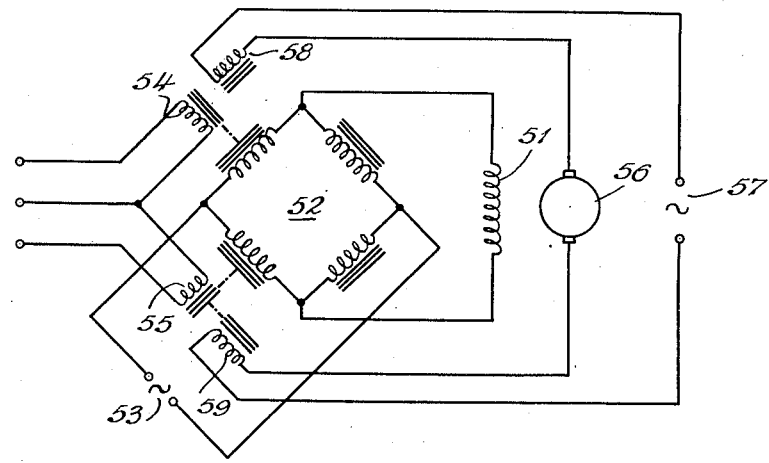
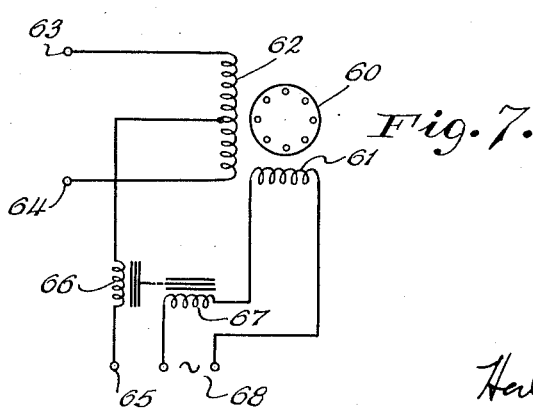
*Fig. 7.*
INVENTORS
ROBERT S. CURRY, JR.
PERCY HALPERT
BY
Herbert P. Thompson
their ATTORNEY.

UNITED STATES PATENT OFFICE 2,661,452

SERVOMOTOR AND CONTROL SYSTEM THEREFOR

Robert S. Curry, Jr., Baldwin, and Percy Halpert, Hempstead, N. Y., assignors to The Sperry Corporation, a corporation of Delaware Application January 29, 1948, Serial No. 5,154

20 Claims. (Cl. 318—229)

Our invention generally relates to servomotors and servomotor control systems which are designed to provide the desired operational characteristics with a minimum of weight and size for the amount of power output derived therefrom. For example, our invention has particular application to automatic pilot work for aircraft where the space occupied by equipment should be maintained at a minimum while obtaining the desired power output. Additionally, power consumption should be reduced as much as possible and particularly during standby conditions when the apparatus is producing no output.

In those types of servomotor systems to which the present invention relates, it is customary to provide a servomotor having at least two field windings, one of which is supplied with a control current to control the direction of rotation of the motor and also its speed or torque output while a second winding is constantly energized from a suitable potential source. It is our purpose to provide a servomotor or servomotor control system of the foregoing character in which the power consumed by the constantly excited winding is reduced during standby conditions while higher torque output is obtained for the size of the motor under motor operating conditions.

That is to say, with zero control signal, the armature current is reduced, but when, for example, a large error value appears with a resultant larger error signal and strong motor field excitation, the armature current is increased thereby providing a higher motor torque output than would be obtained if a normal safe armature current of fixed or constant value were supplied of insufficient magnitude to harm the armature under zero error conditions.

To obtain the foregoing results, our invention contemplates the use of a saturable reactor to reduce the power consumption of the constantly excited motor winding during standby conditions, said reactor including a control winding which functions under motor operating conditions to increase the current in the constantly excited winding whereby to reduce the standby power consumption of the motor and to increase its torque output during operating conditions above that which otherwise could be obtained for a given size of motor.

Broadly speaking, therefore, it is the primary object of this invention to provide a servomotor or servomotor system in which the current supplied to the constantly excited winding thereof is regulated by means of a variable impedance, such for example, and preferably a saturable reactor, which in turn is controlled in accordance with the current supplied to the control winding of the motor.

More particularly, it is an object of our invention to provide a motor of the foregoing character in which the stator core of the motor is employed as the core of the reactor.

In the case of D. C. motors having a constantly excited armature and a control field, the large power loss in the armature restricts both the size and use of these motors; as a practical matter, to small sizes such as fractional horsepower motors. The principal reason for using motors of this type is because of the large power gain realized when relatively low power is supplied to the control field winding. Since D. C. motors are inherently brute force types of motor when considering the size thereof as compared to other motors, high torque output can be realized by employing a relatively small size of motor when the armature current is controlled in the manner above described. This fact may be clearly realized from a consideration of the D. C. motor torque equation:

$$T = K\phi I_a$$

where $\phi$ is the control field flux and $I_a$ is the armature current. Both the field current and armature current control the torque and, for relatively small values of field flux or current, it is desirable to provide relatively high armature current values in order to realize a high torque output. It is therefore a further object of our invention to provide a D. C. motor or motor control system in which the motor field windings are so energized as to control the direction of operation and torque output of the motor while the armature is supplied with unidirectional current which is limited to a low level during standby conditions but which increases when the motor field is supplied with current.

More particularly, it is a further object of our invention to provide a D. C. motor of the foregoing character in which the armature current is supplied by a rectifier which in turn is energized from a suitable source of alternating current through a saturable reactor, the unidirectional flux in which is controlled in accordance with the magnitude of current supplied to the field windings of the motor.

The still further object resides in providing a D. C. motor of the above character in which the stator core of the motor serves as a core of the saturable reactor.

Another object resides in providing motor control systems of the foregoing characters in which the field excitation of a speed generator driven by the servomotor is controlled by means of a saturable reactor to be varied when the control field current supplied to the servomotor is varied, whereby to improve the torque-speed characteristic of the servomotor output.

A still further object of our invention resides in providing a servomotor control system wherein both the current supplied to the constantly excited winding of the motor and the current supplied to the control field winding of the motor are controlled by means of a saturable reactor.

With the foregoing and still other objects in view, our invention includes the novel elements and the combinations and arrangements thereof described below and illustrated in the accompanying drawings, in which:

Fig. 1 schematically represents a preferred form of servomotor system embodying a preferred servomotor construction;

Fig. 2 schematically illustrates a preferred motor construction;

Fig. 3 is a wiring diagram of a modified servomotor control system embodying a speed voltage generator having a variably excited field winding;

Fig. 4 illustrates the improved torque-speed characteristic curves of the motor output in the system of Fig. 3;

Fig. 5 is a wiring diagram of a modified form of our invention;

Fig. 6 is a wiring diagram of another modification thereof; and

Fig. 7 is a wiring diagram of a modified form of our invention as embodied in a two-phase motor.

Since, as above indicated, our invention is primarily directed to a servomotor or servomotor system in which the space occupied by the parts thereof and weight is reduced as much as possible while providing the desired torque output and is therefore primarily adapted for aircraft automatic pilot work, we have illustrated in Fig. 1 a preferred motor and control system which is designed to operate a control surface of an aircraft in accordance with a signal voltage. In Fig. 1, 1 indicates generally a transmitter of the selsyn type from which the primary control signal is derived. The rotor 2, or single phase winding of the transmitter which is energized from a suitable source 3 of alternating current, is positioned in the exemplary system herein shown by means of a directional gyro 4. The multi-circuit stator windings of the transmitter are connected by leads 5 in multi-circuit fashion to the corresponding stator windings of signal generator 6 which also may be of the selsyn type. The rotor winding 7 of signal generator 6 is normally stationary but is capable of being rotated by a variable speed drive, indicated generally at 8, comprising a drum, ball and disc arrangement, the disc being driven by a constant speed motor 9 and the ball carriage being positionable by a rack 10 and pinion 11. A knob 12 affords a manual operation of the pinion 11 so that the rotor 7 of the selsyn signal generator may be maintained stationary or rotated at any desired rate set in by the knob 12. The rotor winding 7 is connected to the input of a phase sensitive amplifier and rectifier 13, the output which is connected to the differential field windings 14 of the servomotor indicated generally at 15.

The servomotor is preferably of the character of that shown in Fig. 2 wherein the stator core 16 of the motor is employed as the core for the saturable reactor controlling the armature current. In Fig. 2, the stator core of the motor is shown as generally cylindrical in form, although of course the configuration thereof may be varied, and the core includes the field poles 17 about which are wound the field windings 14 herein illustrated as arranged in a differential manner to be differentially controlled by the output of an amplifier such as amplifier 13, which may be connected as shown in Fig. 1 or to the terminals 18 in Fig. 2. The armature 19 of the motor is connected through brushes in the usual way and through leads 20 across one diagonal of a full wave rectifier bridge 21. The other diagonal of the rectifier, or its input, is connected through windings 22 and 23 to a source of suitable alternating current 24. One winding 22 or 23 may be used, or both, as desired. These windings in connection with the core 16 of motor 15 serve to limit the armature current under standby conditions because of the high impedance offered by the coils to the alternating current. Hence, the power loss in the armature during standby conditions is much less than it would be if connected directly across a potential source such as rectifier 21 providing the desired voltage for motor operating conditions. However, when current is supplied from the amplifier to the field windings 14, a unidirectional flux is set up in the core of the motor which functions to decrease the impedance of coils 22 and 23 to alternating current and as the unidirectional field flux increases the A. C. impedance of the saturable reactor coils 22 and 23 decreases, thereby increasing the armature current under operating conditions of the motor above its value under standby conditions.

It will be understood that Fig. 1 schematically illustrates the motor of the type above described and illustrated in Fig. 2. In Fig. 1, the windings 22 and 23 of the saturable reactors are shown adjacent the field winding 14 for the purpose of indicating that they are mounted on the stator core of the motor and the axes of the windings 22 and 23 are illustrated as extending at right angles to the axis of the motor field winding 14 to indicate lack of mutual induction between these windings. In Fig. 1, we have shown the armature 19 of motor 15 as operatively connected through transmission mechanism, schematically illustrated by the dot-dash line 25, to a gear train 26 which in turn, through suitable devices, is connected to actuate a control surface 27 of the aircraft. The windings 22 and 23 on the core of motor 15 constitute the load windings of an armature current-controlling saturable reactor while the field windings 14 function as the control windings of the reactor.

Briefly, the operation of the system shown in Fig. 1 and the motor of Fig. 2 is as follows. The directional gyro 4 serves to provide a directional reference for controlling the heading of the craft. If it is desired to execute a turn at some predetermined rate, the knob 12 is turned so as to cause the motor 9 to rotate the rotor 7 of the signal generator 6 at the desired rate. When this occurs, a signal voltage is developed in the rotor winding 7 proportional to the relative displacement of the rotors 2 and 7 of the selsyn devices from a synchronous position thereof. As a result, the phase-sensitive amplifier 13, which differentially excites the motor field winding 14, will produce a unidirectional motor field having a direction dependent upon the phase sense of the signal voltage derived from rotor 7 of the signal generator thereby producing a rotation of motor 15 in one direction or the other, depending upon the phase sense of the control signal voltage. The servomotor 15 will therefore actuate the control surface 27 of the aircraft so as to produce a turn of the craft in azimuth at a rate proportional to the rate of rotation of the rotor 7 of signal generator 6. Normally when no rate of turn signal is put in, any deviation of the craft from the heading established by the directional gyro will cause an operation of motor 15 to operate the control surface of the craft so as to return the craft to the prescribed heading.

It will be evident that under standby conditions, that is, when zero signal voltage is supplied to the amplifier 13, the power loss in the constantly excited armature is reduced by the windings 22 and 23 of the saturable reactor. However, when the field winding 14 is energized to provide a resultant unidirectional flux in the field of the motor, the armature current increases and therefore relatively high torque with low power consumption under standby conditions is obtained for a given size of motor.

Of course, the saturable reactor may constitute a separate unit as illustrated in Fig. 5 of the drawings and our invention, in its broader aspects, contemplates the use of a saturable reactor as a separate unit. However, since the stator core of a motor ordinarily may accommodate the saturable reactor windings and serve as the core therefor without any appreciable increase in size, saving in both space and weight is effected by utilizing the motor frame or core for this purpose.

In Fig. 3, we have shown a modification of our invention in which the differential control field windings 28 are adapted to be connected to the output of an amplifier as above described and the armature 29 of which is connected through a full wave rectifier bridge 30 and through saturable reactor windings 31 and 32 to a source of alternating current 33. In Fig. 3 the windings 31 and 32 are diagrammatically illustrated as mounted on the stator core of the motor as in Figs. 1 and 2. In this embodiment of our invention however, the motor armature 29 in addition to driving a load is connected as indicated by the dot-dash line 34 to drive a generator 35 herein termed a speed generator or one which will provide a voltage output proportional to the speed at which it is driven when excited with a constant field. The speed generator is herein illustrated by way of example as a D. C. generator. In accordance with our invention however, the field 36 of the generator does not receive constant excitation such as from a fixed D. C. source, but is connected across one diagonal of a rectifier bridge 37, the other diagonal of which is connected to series connected windings 38 and 39. Windings 38 and 39 are mounted in mutual inductive relation with the windings 31 and 32 so that under standby conditions of the motor, when no current is supplied to the field thereof, an A. C. voltage will be induced in the windings 38 and 39 to feed the bridge rectifier 37 and thereby supply field excitation to the generator. However, when the field of motor 29 is excited, the field will produce a unidirectional flux in the motor core embodied in the saturable reactor which will not only increase the armature current in the armature 29, but will reduce the voltage supplied from the windings 38 and 39 to the bridge rectifier 37 and therefore reduce the excitation of the speed generator. This unidirectional flux is, of course, reversible to provide rotation of the motor in a direction depending upon the polarity or phase sense of the control signal. With this arrangement, we not only experience the improved motor characteristics above described in connection with Figs. 1 and 2, but we also greatly improve the desired torque-speed characteristic of the motor. In other words, at low speeds and with high field current, a relatively low damping voltage or speed voltage is derived from the generator 35 which voltage is supplied through leads 40 to winding 41 which is arranged to oppose the differential field winding 28 or operate in a degenerative fashion. In other words, under starting conditions or at low speeds, very little velocity voltage is fed back for damping purposes thereby providing a higher starting torque without impairing the desired characteristics of the motor because very little or no damping or antihunting voltage is necessary under such conditions. The dotted line curves of Fig. 4 clearly illustrate the torque-speed characteristics of a motor having a damping control of the foregoing character, and it will be noted that they demonstrate a stable system such that modifications of the characteristics may be effected by the use of suitable apparatus but basically the system will be stable and operate as a proportional control system. However, at higher speeds this voltage will increase and provide the necessary damping. This will be readily seen by realizing that when the control signal reduces to zero, under which conditions the motor should stop, the field excitation will go to zero and maximum excitation of the speed generator will result to thereby provide a high damping voltage.

An inspection of Fig. 4 will show how the torque-speed characteristic of this motor is improved by controlling the velocity voltage in the foregoing manner. In Fig. 4, the full line curves 42 illustrate the typical torque-speed characteristics of the basic motor, while the dotted line curves 42a, which extend in generally parallel relationship, illustrate the torque-speed characteristics of our system. It will be noted that the curves 42a extend in generally parallel relationship showing a more linear control or proportional control system.

In Fig. 5, we have shown a modification of our invention which is generally similar to those hereinabove described. The differential motor field winding 43 is adapted to be connected to a source of controlled field current such as the output of amplifier 13. The armature 44 is energized through a bridge rectifier 45 and saturable reactor windings 46 and 47 from a source of alternating current 48. However, in this case, the saturable reactor is separate from the motor core and comprises windings 49 and 50 which are connected in parallel with the motor field windings. The cores for the windings 46 and 49 are schematically illustrated at right angles to each other as are the cores 47 and 50 for the purpose of indicating that the windings are not mutually inductive. This modification of our invention operates in the same manner as those hereinabove described to control the armature current, but the saturable reactors may be mounted remote from the motor itself, such for example, as adjacent the amplifier.

Fig. 6 illustrates a still further modification or an A. C. version of our motor and motor control circuit. The field winding of the motor is indicated at 51. The alternating current supplied thereto is controlled by the inductance bridge indicated generally at 52 which is energized from alternating current source 53. The control windings 54 and 55 may be differentially energized as from the output of amplifier 13 with unidirectional current to effect an unbalance of bridge 52 upon the presence of an input signal to the amplifier so that the phase sense and magnitude of the alternating current supplied to the field 51 is dependent upon the phase sense of the signal voltage and its magnitude. The armature 56 of the motor is also excited with alternating current from source 57 or if desired from source 53, the proper phase relationship being obtained by employing a conventional phase shifting circuit if necessary. The armature current however is fed through saturable reactor windings 58 and 59 which are connected in series between the armature and the current source. As schematically indicated in Fig. 6 by the core representations, the windings 54 and 55 produce a unidirectional flux in the core which reduces the impedance of coils 58 and 59 to alternating current but the coils 54 and 55, 58 and 59 are arranged in a non-mutual inductive relationship. Hence, the current in windings 54 and 55 not only controls the excitation of the motor field windings, but also the armature current, effecting an increase in the armature current when the motor field is energized and reducing the armature current under standby conditions.

In all of the foregoing modifications of our invention, the core of the saturable reactor may have such permeability as to substantially immediately increase the armature current to full value for small values of field current supplied to the motor, or, they may be arranged, as is preferred in the present invention, to provide a progressive increase in armature current as the field strength increases. Furthermore, when we speak of saturation as a saturable reactor herein, we mean to include a core which may be saturated to some partial degree and within the limits of zero to 100% saturation. The modification of our invention shown in Fig. 7 is also an alternating current motor embodying a two phase motor comprising the armature 60, one phase winding 61 and a differential phase winding 62. Winding 62 is adapted for connection to the output of an amplifier such as a phase-sensitive amplifier, with the terminal 63 of the winding connected for example to the plate of one output tube while terminal 64 thereof is connected to the plate of the other output tube, the amplifier being a balanced differential amplifier. The plate voltage is applied to terminal 65 and through winding 66 of a saturable reactor to the mid tap on motor winding 62. The other phase winding 61 of the motor is connected in series with a saturable reactor winding 67 across a source of alternating current 68. With this arrangement, phase 61 is constantly excited, but the current therein is reduced by the impedance of the saturable reactor winding 67. However, when the other phase winding 62 is energized, as with pulsing D. C., the direction thereof being dependent upon the polarity sense or phase sense of the control signal, a unidirectional flux is produced by winding 66 in the core of the saturable reactor and thereby reduces the impedance of winding 67 to A. C. In a system of this character, it is preferable to bias the tubes of the amplifier to slightly below cut-off under quiescent conditions, or when there is zero input signal, to thereby provide maximum impedance to the flow of current to the constantly excited phase 61 of the motor.

It will be observed that in the various modifications of our invention, herein illustrated and described, the constantly excited winding of the motor, whether it be an armature or phase winding, is excited under standby conditions with a reduced current flow thereby reducing heating and standby power losses. Furthermore, the armature or constantly excited field current is increased when the control field winding is energized and the motor is operated. Additionally, in the D. C. type motors of the present invention, which are inherently a brute force type of motor, we provide a higher torque to inertia ratio. Hence, not only are the operating characteristics of the motor improved but a smaller motor than would otherwise be required for producing the desired torque output may be employed to thereby provide a minimum of weight and space consumption with lower standby losses and higher efficiencies.

In the drawings the schematically represented cores are illustrated at right angles to each other not to represent their physical relationship but to indicate lack of mutual induction between the coils associated therewith, and the dot-dash lines connecting such cores indicates that they may be integral or component core parts of a magnetic circuit. The saturable reactors, as separate units, may be formed in any conventional manner, and the motor core and coil arrangement shown in Fig. 2 is an exemplary form of the geometry thereof, but rather than poles, a permeable member would extend between opposite sides of the core bearing the D. C. winding.

Since many changes could be made in the above constructions and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A motor comprising two separately excited windings, a controllable unidirectional current source connected to energize a first only of said windings, a potential source and saturable reactor means connected in circuit with the second winding of said motor to provide continuous excitation thereof, said saturable reactor including a winding connected in circuit with said controllable current source whereby the current in said second motor winding increases with an increase in current input to the first motor winding.

2. A motor comprising two separately excited windings and a core having a first of said windings thereon, a controllable unidirectional current source connected to energize said first motor winding, a source of potential and a second winding mounted on said core and connected in circuit with said source of potential and the second of said motor windings, said core functioning to control the impedance of said second winding under the control of said first winding.

3. A motor comprising a field winding and an armature, a controllable unidirectional current source connected to control the energization of said field winding, a potential source connected to energize said armature, and saturable reactor means connected in circuit between said potential source and said armature, said reactor including a winding connected to be energized with the controlled unidirectional current whereby the armature current increases when said field winding is energized.

4. In a motor control system, a source of variable control current, a motor comprising a stator of permeable material having a field winding thereon adapted to be connected to said variable control current supply, and an armature, a rectifier connected with said armature, a second winding on said stator connected with a source of alternating current and with said rectifier so that the armature current will vary in accordance with variations in the current in said field winding.

5. In a motor control system, a motor including a field and an armature, a source of signal voltage, an amplifier therefor having its input connected to receive said signal voltage and its output being connected to energize the field of said motor, a rectifier connected with said armature, saturable reactor means having one winding connected with said rectifier and with a source of alternating current, a second winding of said reactor means being connected for excitation by the voltage output of said amplifier.

6. In a motor control system, a motor including a stator of permeable material having a field winding thereon and an armature, a source of signal voltage, an amplifier therefor having its input connected to receive said signal voltage and having a unidirectional current output connected to energize said motor field winding, a rectifier connected with said armature, and a winding on said stator connected with a source of alternating current and with said rectifier.

7. In a motor control system, a source of variable magnitude, unidirectional control voltage, a motor having a control field winding and a constantly excited winding, said control voltage being connected to energize said field winding, saturable reactor means controlled by said unidirectional voltage and having a winding in circuit with said constantly excited winding to control the current therein, a speed voltage generator driven by said motor, a winding on said motor connected for excitation by the speed voltage and arranged to produce a field bucking the control field, said generator including a field winding, a rectifier connected with the generator field winding, and saturable reactor means controlled by said unidirectional voltage and including an A. C.-excited winding connected in circuit with said rectifier.

8. In a motor control system, a source of variable magnitude, control voltage, a motor connected for control by said voltage, a speed voltage generator driven by said motor, means including a feed back circuit connected to the output of said generator for reducing the motor field controlled by said control voltage in accordance with the magnitude of the speed voltage, a source of current for exciting the field of said generator, and means in circuit with said generator field and current source for controlling the generator field excitation by the control voltage.

9. In a motor control system, a source of variable magnitude, control voltage, a motor connected for control by said voltage, a speed voltage generator driven by said motor, means including a feed back circuit connected to the output of said generator for reducing the motor field controlled by said control voltage in accordance with the magnitude of the speed voltage, a source of current for exciting the field of said generator, and means in circuit with said generator field and current source for reducing the generator field excitation upon energization of the motor by said control voltage.

10. In a motor control system, a source of variable magnitude, unidirectional control voltage, a motor connected for control by said voltage, a speed voltage generator driven by said motor, means including a feed back circuit connected to the output of said generator for reducing the motor field controlled by said control voltage in accordance with the magnitude of the speed voltage, means including a source of alternating current, a rectifier and a saturable reactor connector in circuit with the field of said generator, one winding of said reactor being connected in circuit between the rectifier and A. C. source and a second winding thereof being excited by the unidirectional control voltage whereby to vary the A. C. impedance of said reactor in accordance with said control voltage.

11. A motor having a two phase field winding and an armature, a first of said phase windings being a differential winding, a fixed current source for the second of said phase windings, and saturable reactor means in circuit with said current source and said second phase winding, said saturable reactor means including means controlled by the voltage controlling the differential phase winding for varying the impedance thereof.

12. A motor having a two phase field winding and an armature, a first of said phase windings being a differential winding, a fixed current source for the second of said phase windings, and a saturable reactor having one winding thereof in circuit with said current source and said second phase winding and a control winding in circuit with the differential phase winding whereby said saturable reactor provides a variable impedance to current flow to said second phase winding under the control of the current to said differential winding.

13. A motor comprising a core having a field winding thereon and an armature, a source of variable control current connected with said field winding, a fixed current source for said armature, and variable impedance means having a magnetic circuit including a portion of said motor core, said impedance being connected in circuit between said fixed current source and said armature whereby variations in flux density in said motor core caused by changes in current in said field winding will produce corresponding variations in the armature current of said motor.

14. In a motor control system, a motor having a pair of separately excited windings, control means including a signal source and means for exciting a first only of said windings in accordance with said signal, a source of current for the second of said windings, and saturable reactor means in circuit with said current source and said second winding for controlling the current flow in said second winding, said saturable reactor means including a winding connected for control by said control means and said winding of the saturable reactor being arranged to provide an increase of current in the second winding of said motor with an increase in current in the first motor winding.

15. In a control system, a dynamoelectric machine having a pair of separately excited windings, control means including a signal source and means for exciting a first only of said windings in accordance with said signal, a source of current for the second of said windings, and saturable reactor means in circuit with said current source and said second winding for controlling the current flow in said second winding, said saturable reactor means including a winding connected for control by said control means and arranged to produce an increase of current flow in said second winding with an increase in current in the first winding.

16. In a control system, a dynamoelectric machine having a pair of separately excited windings and a stator core having a first of said windings thereon, control means including a signal source and means for exciting a first only of said windings in accordance with said signal, a source of current for the second of said windings, and a winding mounted on the core of said machine and in circuit with said second winding and said source of current therefor, said last mentioned winding and stator core being so correlated and relatively arranged that the current in said second winding will increase with an increase in current in said first winding.

17. In a motor control system, a motor comprising two field windings and a core having a first of said field windings thereon, a control circuit including a signal current source connected to control the energization of said first field winding, a speed voltage generator driven by said motor and having its output connected in degenerative fashion to said control circuit, said generator comprising a field winding, and a winding mounted on the core of said motor and in circuit with said generator field winding for controlling the field excitation of said generator in accordance with the current supplied to said first field winding of said motor.

18. In a motor control system, a motor comprising two field windings and a core having a first of said field windings thereon, a control circuit including a signal current source connected to control the energization of said first field winding, a fixed current source, a winding mounted on said core and connected in circuit with said fixed current source and a second of said motor field windings, said core functioning to control the current in said second field winding in accordance with the control current supplied to the first field winding on said core, a speed voltage generator driven by said motor and having its output connected in degenerative fashion to said control circuit, said generator comprising a field winding, and a winding mounted on the core of said motor and in circuit with said generator field winding for controlling the field excitation of said generator in accordance with the current supplied to said first field winding of said motor.

19. In a motor control system, a motor comprising an armature, a rectifier connected with said armature, a saturable reactor having a load winding connected in circuit with a source of alternating current and said rectifier, a motor field winding and control winding for said saturable reactor, and a source of variable magnitude control current connected to said motor field winding and control winding whereby the magnitude of the armature current will vary with said control current.

20. In a motor control system, a motor comprising an armature, a rectifier connected with said armature, a saturable reactor having a load winding connected in circuit with a source of alternating current and said rectifier, and a source of variable magnitude unidirectional control current connected to said motor field winding and control winding whereby the magnitude of the armature current will vary with said control current.

ROBERT S. CURRY, JR.
PERCY HALPERT.

References Cited in the file of this patent

UNITED STATES PATENTS

| Number | Name | Date |
|---|---|---|
| 1,050,444 | Fynn | Jan. 14, 1913 |
| 1,955,322 | Brown | Apr. 17, 1934 |
| 2,100,715 | Jenks | Nov. 30, 1937 |
| 2,399,931 | Lamborn | May 7, 1946 |
| 2,411,608 | Lesnick | Nov. 26, 1946 |
| 2,423,228 | Conklin | July 1, 1947 |
| 2,462,249 | Ziegler | Feb. 22, 1949 |
| 2,468,117 | Schaelchlin | Apr. 26, 1949 |